Patented July 4, 1933

1,916,979

UNITED STATES PATENT OFFICE

WILLY O. HERRMANN AND ERICH BAUM, OF MUNICH, GERMANY, ASSIGNORS TO CONSORTIUM FÜR ELEKTROCHEMISCHE INDUSTRIE, G. M. B. H., OF MUNICH, GERMANY, A CORPORATION OF GERMANY

PROCESS FOR PRODUCING ASYMMETRICAL DICHLORACETONE

No Drawing. Application filed December 12, 1930, Serial No. 502,002, and in Germany December 27, 1929.

According to a known process, asymmetrical dichloracetone is produced by saturating acetone with chlorine at low temepratures. The yield is only 10 per cent of the theoretical amount, and a large amount of symmetrical dichloracetone and higher chlorinated products are formed.

Now we have found a process by which the asymmetrical compound can be prepared as the main product. In contrast to the other methods, the chlorination is carried out at temperatures above 30° C., and may suitably be carried out at the boiling point of the liquid. The addition of chlorine carriers as for instance iodine, antimony pentachloride, ferric chloride etc. is suitable.

The formation of the asymmetrical compound is still more favorably influenced by working in such a manner that in the beginning only part of the acetone is charged into the reaction vessel, and the remaining quantity is gradually added as the reaction proceeds.

Example I 1,5 kg of acetone were chlorinated at the boiling point, the distillation being conducted in a flask fitted with a reflux condenser. About one tenth of the acetone was first charged into the flask and the remaining quantity was gradually added as the chlorination proceeded. The generated hydrochloric acid was condensed in a water receiver. 1612 g of asymmetrical dichloracetone, corresponding to 48,6 per cent of the theoretical amount were obtained besides 940 g of the symmetrical compound and 110 g of higher boiling compounds.

Example II 1,5 kg acetone mixed with 3,0 g of antimony pentachloride were chlorinated as described in Example I. 1870 g of asymmetrical dichloracetone, corresponding to 57 per cent of the theoretical amount were obtained besides 893 g of the symmetrical compound and 130 g of higher boiling compounds.

What we claim is:

1. A process for producing asymmetrical dichloracetone from acetone and chlorine comprising chlorinating acetone by heating the mixture above 30° C.

2. A process for producing asymmetrical dichloracetone from acetone and chlorine comprising chlorinating acetone by heating the mixture above 30° C. in the presence of chlorine carriers.

3. A process for producing asymmetrical dichloracetone from acetone and chlorine, comprising chlorinating acetone by heating the mixture above 30° C., charging the reaction vessel only with a part of the acetone and adding the remaining quantity continually as the chlorination proceeds.

4. A process for producing asymmetrical dichloracetone from acetone and chlorine comprising chlorinating acetone by heating the mixture above 30° C. in the presence of chlorine carriers, charging the reaction vessel only with a part of the acetone and adding the remaining quantity as the chlorination proceeds.

5. A process for producing asymmetrical dichloracetone from acetone and chlorine comprising chlorinating acetone by heating the mixture above 30° C. in the presence of antimony pentachloride.

6. A process for producing asymmetrical dichloracetone from acetone and chlorine comprising chlorinating acetone by heating the mixture above 30° C. in the presence of antimony pentachloride, charging the reaction vessel only with a part of the acetone and adding the remaining quantity continually as the chlorination proceeds.

7. A process for producing asymmetrical dichloracetone from acetone and chlorine comprising distilling the mixture at the boiling point to effect chlorination of the acetone.

8. A process for producing asymmetrical dichloracetone from acetone and chlorine comprising distilling the mixture at the boiling point in a reflux condenser to effect chlorination of the acetone.

9. A process for producing asymmetrical dichloracetone from acetone and chlorine comprising distilling the mixture at the boiling point in a reflux condenser in the presence of a member selected from the group consisting of iodine, antimony pentachloride and ferric chloride to effect chlorination of the acetone.

10. A process for producing asymmetrical dichloracetone from acetone and chlorine comprising distilling the mixture at the boiling point in a reflux condenser in the presence of a member selected from the group consisting of iodine, antimony pentachloride and ferric chloride to effect chlorination of the acetone, charging the reaction vessel with only a part of the acetone and adding the remaining quantity continually as the chlorination proceeds.

In testimony whereof we have hereunto subscribed our names.

WILLY O. HERRMANN.
ERICH BAUM.